United States Patent [19]

Vasiliev et al.

[11] 4,368,121
[45] Jan. 11, 1983

[54] DAM SPILLWAY

[76] Inventors: Jury N. Vasiliev, ploschad Vosstania, 1, kv. 60; Evgeny P. Gladkov, 2 Sinichkina ulitsa, 22, kv. 1, both of Moscow, U.S.S.R.

[21] Appl. No.: 233,198

[22] Filed: Feb. 10, 1981

[30] Foreign Application Priority Data

Jul. 9, 1979 [SU] U.S.S.R. ............................ 2792944

[51] Int. Cl.³ ............................................. C02F 1/24
[52] U.S. Cl. .................................. 210/170; 210/221.2; 405/80; 405/108; 261/DIG. 75
[58] Field of Search .................... 405/80, 127, 107, 52, 405/108; 210/170, 221.2, 220, 221.1, 703, 747; 261/DIG. 75

[56] References Cited

U.S. PATENT DOCUMENTS 3,704,008  11/1972  Ziegler ................................ 210/170

FOREIGN PATENT DOCUMENTS 529946   7/1931  Fed. Rep. of Germany ...... 405/108
735760   5/1943  Fed. Rep. of Germany ...... 405/108
233513  11/1944  Switzerland ........................ 405/108
582360  11/1977  U.S.S.R. .............................. 405/52

*Primary Examiner*—Benoît Castel
*Attorney, Agent, or Firm*—Myron Greenspan

[57] ABSTRACT

A dam spillway for the passage of water from a forebay to an afterbay comprises a means for compressing the atmospheric air by the passing water and a floatation chamber connected to said means. The floatation chamber incorporates a froth separating cavity having a lower wall thereof in the form of a smooth concave curve. Accommodated in the upper portion of the froth separating cavity substantially above the water level of the afterbay is a froth remover in the form of a tubular member provided with a longitudinal slot facing the interior of the cavity. Secured on the froth remover is an assembly of water sprinkling froth suppressing sprayers adapted to communicate with the forebay. Connected to the upper portion of the froth remover adjacent to the sprayer assembly are perforated air ducts secured at the bottom of the afterbay.

4 Claims, 2 Drawing Figures

DAM SPILLWAY

FIELD OF THE INVENTION

The present invention relates to weirs of hydraulic constructions, and more particularly to spillways of dams.

The invention can find application in cleaning water passing through a headwork from floatable contaminants and for aerating the water downstream of the dam.

BACKGROUND OF THE INVENTION

Known in the art are aeration systems (cf. U.S. Pat. Nos. 3,461,674; Cl. 405-74, published Jan. 20, 1967; and 3,893,924; Cl. 210-220, published Oct. 19, 1973) designed to aerate water basins and comprising arranged essentially at the bottom of the basin a plurality of perforated pipes through which an air-water mixture is ejected. The air-water mixture is fed into the pipes under a pressure substantially exceeding the pressure in the bottom portion of the water basin. This is afforded either by an air-water mixing device (cf. U.S. Pat. No. 3,461,674) into which air and water are supplied by an air compressor and water pump respectively, or by an air-liquid jet aerator (cf. U.S. Pat. No. 3,893,924) wherein atmospheric air is entrained into a water jet produced by a pump.

However, both these systems require an outside power source to drive the air compressor and water pump in order to force the atmospheric air into the bottom layers of the basin being aerated. By virtue of the intermittent mode of operation of these systems, the amount of power consumed to operate them for a given period of time, such as one year, becomes quite substantial. Besides, the aforementioned systems lack structural features enabling them to be also used as dam spillways.

There is known a dam spillway (cf. USSR Inventor's Certificate No. 348,678; Cl. E 02 B 8/06, published Aug. 23, 1972) wherein the velocity head of the spilled water is used to entrain air thereinto, the head being the result of overfall transformation between a forebay and an afterbay. Incorporated into the above spillway system are outlets of conduits communicating with the atmosphere and layed essentially below the spillway surface, the air being entrained into the water flow by virtue of an underpressure produced by the mass of water moving along the spillway surface. As a result of utilizing the kinetic energy of the overflow water, this system not only eliminates damage to the spillway surface but provides aeration of the water flow, which acts to enhance the saturation thereof with oxygen. However, because this known system is an open spillway system, static pressure in the flow is close to atmospheric and the underpressure produced in the outlets of the air supplying conduits is negligible; consumption of the atmospheric air entrained into the water flow is low thereby resulting in poor utilization of the kinetic energy of the falling water.

Further known is a dam spillway system designed to effect a passage of water from a holding basin through the dam to a downstream (cf. USSR Inventor's Certificate No. 340,735; Cl. E 02 B 7/00, published June 6, 1972) comprising a means for compressing the atmospheric air by a flow of passing water. Kinetic energy of the water flow is used here more efficiently, since this spillway system features a water conduit defined by a vertically disposed mixing chamber communicating with the atmosphere and a horizontally positioned diffuser, which conduit is a means for compressing the atmospheric air. In the course of the overflow, the falling water acts to entrain into the mixing chamber the atmospheric air via the conduit thereof communicating with the atmosphere. As a result, part of the kinetic energy of the falling water is transmitted to the thus entrained air. Inasmuch as the whole of the water flow is envolved in air trapping, the amount of air thus trapped is sufficient to form an air-water mixture at the outlet of the mixing chamber. The falling water energy is further transmitted to the entrained air in the diffuser wherein the air-water mixture is subjected to a breaking action resulting in that the pressure of the mixture and, consequently, the air contained therein exceeds that of the atmosphere. This allows to force the air contained in the air-water mixture to a certain depth of the downstream. The air bubbles of the air-water mixture tend to float upwards carrying therewith to the surface of the downstream floatable solids. Therefore, by virtue of utilizing the kinetic energy of the falling water this spillway system provides the compression of air by water, aeration thereof and therefore saturation with oxygen.

However, this system suffers from a disadvantage in that the effect of formation of the air-water mixture and floatation of the floatable pollutants by the air bubbles is not used for cleaning the downstream water.

SUMMARY OF THE INVENTION

It is an object of the present invention to provide cleaning of water that passes through a dam from floatable pollutants and further aerating the water in an afterbay by utilizing an overpressure produced by a means for compressing the aerating air entrained by the passing water.

This object is attained in a dam spillway for the passage of water from a forebay to an afterbay comprising a means for compressing atmospheric air by the passing water, according to the invention, the spillway is provided with a floatation chamber incorporating a froth separating expanding cavity adapted to communicate with the means for compressing the atmospheric air and having a lower wall thereof in the form of a smooth concave curve, a froth remover in the form of a tube having a slot facing the froth separating cavity mounted in the upper portion thereof essentially above the level of the afterbay, an assembly of froth suppressing sprayers secured on the froth remover and communicating with the forebay, and perforated air ducts disposed in the afterbay and connected to the upper portion of the forth remover adjacent to the sprayer assembly.

For further fragmentation of the air bubbles to enhance the floatation capacity of the air-water mixture the spillway is preferably provided with a plurality of racks positioned at the inlet to the froth separating cavity.

In order to optimize the operation of the floatation chamber when variations in the levels of the fore and afterbays occur, the froth remover is preferably provided with a cut-off valve.

BRIEF DESCRIPTION OF THE DRAWINGS

These and further objects of the invention will become apparent with reference to a specific embodiment thereof taken in conjunction with the accompanying drawings, in which.

DETAILED DESCRIPTION OF THE INVENTION

Figure 1:
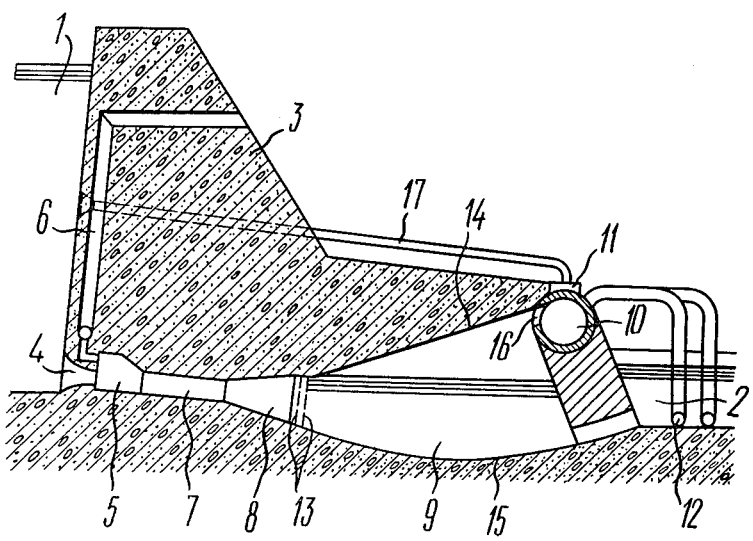
FIG. 1 shows a longitudinal sectional view of a dam spillway according to the invention.

The herein proposed spillway is intended to communicate a forebay 1 (FIG. 1) and an afterbay 2 separated by a permanent dam 3 is comprised of successively arranged means for compressing the atmospheric air by the flow of passing water and floatation chamber in the body of the dam 3. The means for compressing the atmospheric air by water comprises ports 4 for the inlet of water, a forechamber 5 communicating with the atmosphere via air conduits 6, a mixing chamber 7 and a diffuser 8. The floatation chamber incorporates a froth separating expanding cavity 9 communicating with the outlet of the diffuser 8, a froth remover 10, a sprayer assembly 11, and perforated air ducts 12. Arranged essentially at the entrance to the froth separating cavity 9 is a plurality of racks 13 composed of non-streamlined elements. An upper wall 14 of the froth separating cavity 9 is raised toward the downstream of the water flow, whereas a lower wall 15 thereof has the contour of a concave curve. The froth remover 10 is arranged essentially in the upper portion of the froth separating cavity 9; it also can be arranged substantially above the water level of the afterbay 2. The froth remover 10 has the form of a tube having a longitudinal slot 16, the slot 16 being parallel to the water level and facing the froth separating cavity 9.

Secured at the froth remover 10 is an assembly 11 of water sprinkling froth suppressing sprayers adapted to communicate with the forebay 1 by means of a water supply conduit 17.

Figure 2:
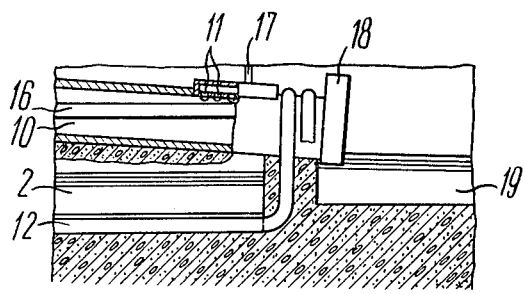
FIG. 2 shows the construction of a froth remover according to the invention as viewed from the afterbay.

Connected to the upper portion of the froth remover 10 adjoining the sprayer assembly 11 (FIG. 2) are perforated air ducts 12 placed in the afterbay 2. The outlet portion of the froth remover 10 accommodates a cut-off valve 18, the froth remover 10 being inclined towards a settling vessel 19.

Passage of water from the forebay 1 through the dam 3 into the afterbay 2 is effected by virtue of a pressure head resulting from a difference in the levels of water in the bays 1 and 2. Under the action of this head, water is caused to enter the intake ports 4 wherein it gains speed and is broken up into separate jets flowing into the forechamber 5 and creating an underpressure therein which acts to induce the atmospheric air to flow into the chamber 5 via the conduits 6. Upon the conjoint movement in the forechamber 5 the water and air come into an intimate contact which signifies the beginning of water aeration. The water jets carry the thus trapped air from the forechamber 5 into the mixing chamber 7, wherein the jets are broken and mixed to form an air-water mixture. As a result of this intensive aeration, active saturation of water with oxygen (i.e., dissolution in water of oxygen contained in the air) and oxidation of those pollutants which are capable of being decontaminated through oxidation occurs. The air-water mixture formed in the mixing chamber 7 then enters the diffuser 8. Upon breaking in the diffuser 8, the major portion of the air-water flow energy is not lost but transformed into a pressure energy resulting in that at the outlet of the diffuser 8 the static pressure of the air-water mixture and that of the air contained therein is raised above the atmospheric pressure. Therewith, saturation of water by oxygen and decontamination of the pollutants through oxidation are continued. Thereafter, the air-water mixture having an overpressure flows from the diffuser 8 into the froth separating cavity 9. A certain amount of the over-pressure is consumed for the passage of the air-water mixture through the plurality of racks 13 to form at the inlet to the froth separating cavity 9 a finely dispersed air-water mixture (to promote the formation of fine air bubbles) which enhances the floatability thereof. The fine air bubbles in the mixture entering the cavity 9 absorb the surface-active pollutants and adhere to the floatable contaminants contained in the water. By virtue of the specific configuration of the froth separating cavity and under the action of the Archimedean and the centrifugal forces arising at the concave lower wall 15, the air bubbles are caused to float upwards carrying the pollutants therewith. As a result, froth containing pollutants are gathered in the upper portion of the cavity 9 defined by the upwardly inclined wall 14 thereof. The cleaned oxygen saturated water flows along the lower wall 15 of the cavity 9 into the afterbay 2. Under the action of the overpressure in the froth separating cavity 9, the froth carrying pollutants and having a density much lesser than that of the water is caused to raise towards the froth remover 10 to enter the slot 16 thereof. Owing to increased pressure and low density of the froth, the froth remover 10 (FIG. 2) can be placed substantially above the water level in the afterbay 2, and more specifically at a height enabling the water level in the settling vessel 19 which underlies the outlet of the froth remover 10 to be even higher than the level in the afterbay 2. The froth moving along the froth remover is suppressed by water sprinkled by the sprayer assembly 11. In order to minimize the consumption of water for froth suppression, the sprayers are preferably of the centrifugal type providing a wider angle of dispersion. The sprayer assembly 11 is fed by water taken from the forebay 1 (FIG. 1) which travels along the conduit 17 (FIG. 2) to be sprayed by virtue of a difference between the level of water in the forebay 1 (FIG. 1) and the height at which the sprayer assembly 11 is disposed. After the froth is suppressed, the water with high concentration of pollutants is drained by gravity through the adjustable cut-off valve 18 into the settling vessel 19. This is possible due to the placement of the froth remover 10 above the settling vessel 19 at an angle thereto. Inasmuch as the water level in the settling vessel 19 is higher than that in the afterbay 2, the water clarified in the settler 19 can be drained by gravity into the afterbay 2. In order to effect additional aeration of the water entering the afterbay 2 from the froth separating cavity 9, the air released from froth suppression and having a certain overpressure is directed from the froth remover 10 to the perforated air ducts 12 arranged at the bottom of the afterbay 2. Additional bubbles of air entering the cleaned water from the perforations together with the finely dispersed air bubbles carried by the treated water from the froth separating cavity 9 can be flown at a considerable distance from the dam 3, which in conjunction with the dissolved oxygen makes it possible to recuperate and maintain the biological capacity of water to self-cleaning.

In the herein proposed construction of a spillway, cleaning of water from floatable pollutants and additional aeration of the cleaned water in the afterbay 2 is effected thanks to the arrangement of the floatation chamber essentially behind the means for compressng the atmospheric air by the water flowing through the dam 3. Due to the specific construction of the expanding froth separating cavity 9, it is possible under the action of the Archimedeian and centrifugal forces arising at the concave lower wall 15 thereof to separate the air-water mixture exiting from the diffuser 8 into cleaned water passing to the afterbay 2 and froth carrying therewith floatable pollutants and gathering in the upper portion of the cavity 9. By virtue of an overpressure produced in the closed froth separating cavity 9 by the means for compressing the atmospheric air by the water passing through the dam, the froth is caused to raise upwards to enter the froth remover 10. Inasmuch as the froth density is by far below that of the water, the froth can be raised at a considerable height which enables the froth remover 10 to be secured substantially above the settling vessel 19 (FIG. 2), wherein the level of water can be maintained substantially higher than that in the afterbay 2. Also, suppression of the froth moving through the froth remover 10 becomes possible due to the arrangement of the sprayer assembly 11 at the froth remover 10, the sprayers acting to sprinkle water onto the foam. Said sprinkling is made possible through intake of water feeding the sprayers from the forebay 2 (FIG. 1) under the action of a difference between the water level in the forebay 1 and the height at which the sprayer assembly 11 is situated. Further, owing to the positioning of the froth remover 10 substantially above the water level in the settling vessel 19 (FIG. 2) at an angle thereto, the water carrying pollutants as a result of froth suppression is drained by gravity into the settling vessel 19. The water can be as well gravity drained to the afterbay 2 after clarification in the settling vessel 19 because the water level in said settling vessel can be maintained essentially above that in the afterbay 2. The air released after froth suppression has an overpressure and therefore can be directed into the afterbay 2 for additional aeration of the cleaned water by escaping the perforated air ducts 12 layed at the bottom of the afterbay 2.

The arrangement of a plurality of racks 13 (FIG. 1) composed of non-streamlined elements at the entrance to the froth separating cavity 9 enables to further break up the air bubbles in the air-water mixture entering the froth separating cavity 9. Preferably, the racks 13 are disposed one after another transversely to the flow of the air-water mixture and are capable of being displaced transversely relative to one another. Although the racks 13 act to somewhat reduce the overpressure in the froth separating cavity 9, their installation is nevertheless justified in view of improved floatation capacity of the air-water mixture. In addition, a certain reduction of pressure in the froth separating cavity 9 is permissible in the herein proposed construction since even a minute overpressure in the froth separating cavity 9 is sufficient to cause the froth to raise and enter the froth remover 10.

By controlling the cut-off valve 18 (FIG. 2) which can be mounted at the exit portion of the froth remover 10, it is possible to vary the value of the overpressure in the froth separating cavity 9 (FIG. 1), which affords to optimize the operation of the floatation chamber when water levels in the forebay 1 and the afterbay 2 change.

The spillway of the heretofore proposed construction permits, by virtue of the arrangement of the floatation chamber behind the means for compressing the atmospheric air by water, along with the passage of water through the dam to clean the passing water from floatable pollutants using only the pressure head produced by the overfall between the water levels in the fore and afterbays 1 and 2 transformed into an overpressure in the air-water mixture by the means for compressing the atmospheric air by the water flow, to clean the passing water from floatable pollutants by collecting froth containing these pollutants, to suppress the froth and ensure drainage by gravity of the pollutants into the settling vessel 19 (FIG. 2) and to additionally aerate the cleaned water in the afterbay 2 (FIG. 1) by utilizing the air released after froth suppression.

What is claimed is:

1. A dam spillway comprising:
    a forebay and an afterbay for receiving water from said forebay;
    a means for compressing the atmospheric air by the passing water which includes ports for the inlet of water, a forechamber communicating with the atmosphere via air conduits, a mixing chamber and a diffuser; and
    a floatation chamber connected to said means for compressing the atmospheric air by the passing water which includes a froth separating cavity in said floatation chamber, inlet and outlet portions of said froth separating cavity, said inlet portion being connected to said means for compressing the atmospheric air by the passing water, a lower wall of said froth separating cavity having the contour of a smooth concave curve; a froth remover in said floatation chamber arranged in the upper portion of said froth separating cavity and placed substantially above the water level in said afterbay in the form of a tubular member having a longitudinal slot therein facing the interior of said froth separating cavity; an assembly of water sprinkling froth suppressing sprayers in said floatation chamber fluidly communicating with said forebay and secured on said froth remover; perforated air ducts in said floatation chamber arranged in said afterbay and connected to the upper portion of said froth remover adjacent to said sprayer assembly.

2. A dam spillway as claimed in claim 1, wherein there is provided a plurality of racks composed of non-streamlined elements and arranged in said inlet portion of said froth separating cavity.

3. A dam spillway as claimed in claim 2, wherein said froth remover is provided with a cut-off valve.

4. A dam spillway as claimed in claim 1, wherein said froth remover is provided with a cut-off valve.

* * * * *